Sept. 2, 1969   J. M. MEEK ET AL   3,465,251
IMPACT DAMPER AND ANTENNA RELEASE MECHANISMS
FOR AIRBORNE RADIO RECOVERY BEACON
Filed April 6, 1966   2 Sheets-Sheet 1
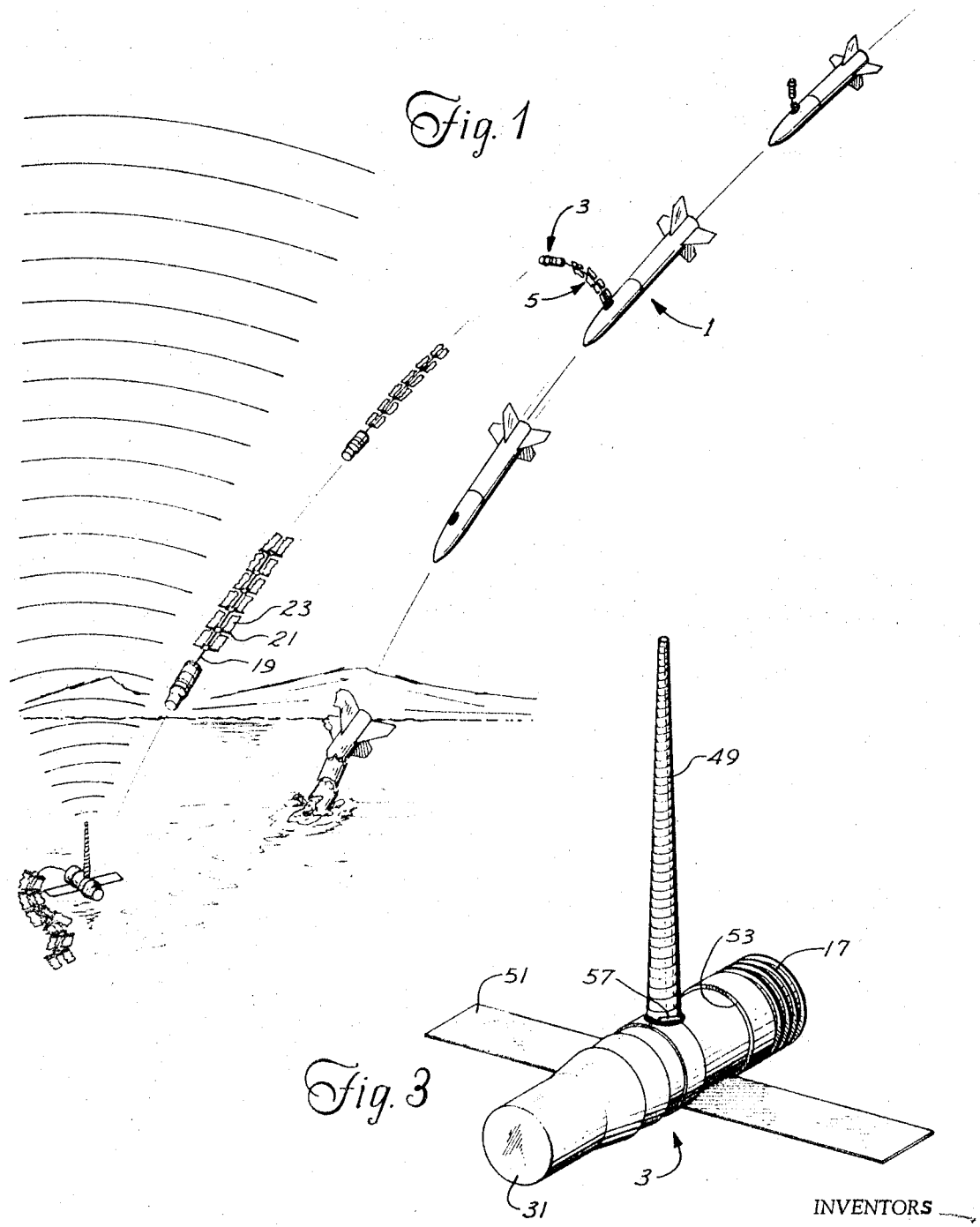
INVENTORS
JAMES M. MEEK
DAVID T. LOKERSON
GARY A. BRIGGS
BY: Harry M. Saragovitz,
Edward J. Kelly, Herbert Berl &
J. P. Edgerton   ATTORNEYS.

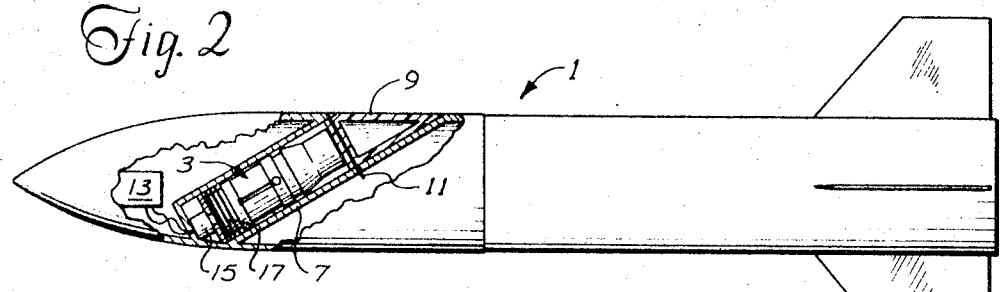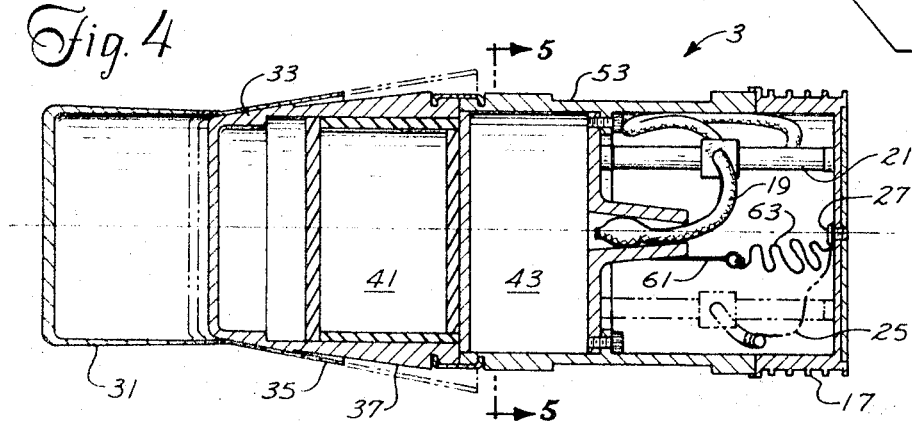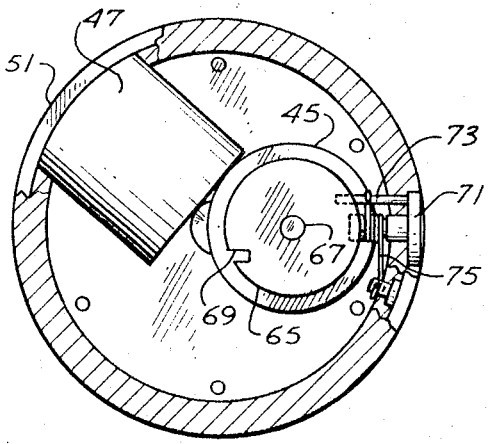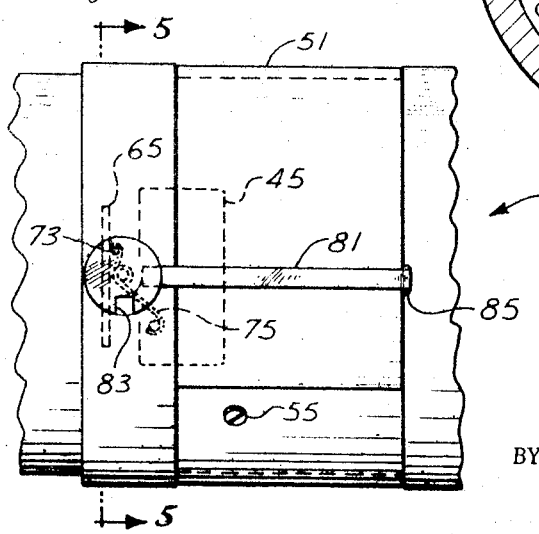
INVENTORS
JAMES M. MEEK
DAVID T. LOKERSON
GARY A. BRIGGS
BY: *Harry M. Saragovitz,*
*Edward J. Kelly, Herbert Berl &*
*J. D. Edgerton* ATTORNEYS.

United States Patent Office 3,465,251
Patented Sept. 2, 1969

3,465,251
IMPACT DAMPER AND ANTENNA RELEASE MECHANISMS FOR AIRBORNE RADIO RECOVERY BEACON
James M. Meek and David T. Lokerson, Silver Spring, Md., and Gary A. Briggs, Falls Church, Va., assignors to the United States of America as represented by the Secretary of the Army
Filed Apr. 6, 1966, Ser. No. 540,773
Int. Cl. H04b 1/02
U.S. Cl. 325—112    8 Claims

ABSTRACT OF THE DISCLOSURE

An airborne radio recovery beacon having a hollow body member of cylindrical shape with a slightly tapered front portion which is partially inserted into a hollow impact damper cup member having a tapered lip portion of a configuration complementary to the shape of the tapered front portion. A self-contained radio transmitter is located within the hollow body member and is connected to a collapsible spring steel antenna which is held within the hollow body member in a substantially flat collapsed condition. The antenna is secured in this position by a metal band surrounding the body member and locked in position by a pin member which is released by a clock mechanism.

---

This invention relates to an airborne radio recovery beacon which transmits a radio signal to facilitate the location and recovery of rockets and other airborne vehicles after impact.

In the testing and operational evaluation of rockets and other missiles containing recorded flight data it is necessary to locate the rocket or missile after impact in order to recover the data, as well as costly instruments and components. Where large test ranges are employed, a relatively small missile is almost impossible to locate, particularly if radar or optical tracking cannot be utilized. Furthermore, the missile may bury itself into the earth upon impact leaving little or no evidence of its location. A number of methods of recovery have been employed in the past with varying degrees of success.

One method of recovery which has yielded favorable results involves the use of dog teams to search for missiles which have been treated with a familiar scent prior to launching. Other methods rely upon a variety of signaling devices such as dye markers, flash charges and radio transmitters. The use of radio transmitters affords the greatest potential for a successful recovery where large distances separate the points of launch and impact.

Accordingly, it is an object of the present invention to provide an airborne radio recovery beacon which is carried by a missile and ejected automatically just prior to impact to transmit radio signals marking the location for recovery.

Another object of the invention is the provision of an airborne radio recovery beacon having novel impact damper means to cushion the shock of impact and protect the operating components of the beacon.

Another object of the invention is the provision of an airborne radio recovery beacon having automatic control of the transmitter operation.

A further object of the invention is the provision of an airborne radio recovery beacon having a collapsible antenna which erects automatically in a vertical position for effective transmission after impact.

In accordance with the present invention these objects are realized in a beacon structure comprising a hollow body member of cylindrical shape having front and rear portions. The front portion is slightly tapered and is partially inserted into a hollow impact damper cup member having a tapered lip portion of a configuration complementary to the shape of said tapered front portion. The cup member expands radially when impact forces the front portion of the hollow body member completely into the cup member thereby providing a cushioning effect for said hollow body member. A preliminary decelerating effect may be obtained by providing air drag means such as a fluttering banner or parachute to slow down the beacon after ejection from the missile and prior to impact.

A self-contained radio transmitter is located within the hollow body member and is connected to a collapsible spring steel antenna which is held within said hollow body member in a substantially flat collapsed condition. The antenna is secured in this position by a metal band surrounding the body member and locked in position by a pin member which is released by a clock mechanism. Upon release the metal band springs out to a flat position where it remains anchored to the hollow body member at the midpoint of the band. The antenna likewise springs out to a fully erect position. The actions of the metal band and the coil spring antenna in springing loose serve to orient the beacon in an upright position to enable proper radio transmission. The transmitter is turned on by the action of a microswitch released when the metal band springs free.

The foregoing and other objects, features and advantages of the invention will be apparent from the following more particular description of a preferred embodiment of the invention, as illustrated in the accompanying drawings in which:

FIG. 1 shows an ejection sequence in perspective in which the radio recovery beacon is ejected from the missile prior to impact;

FIG. 2 is a partial cross-section of a missile showing the radio recovery beacon in position for ejection;

FIG. 3 is a perspective view of the radio recovery beacon of the present invention showing its appearance after impact with the antenna in operative position;

FIG. 4 is a cross-section of a radio recovery beacon body with the impact damper cup in position;

FIG. 5 is a cross-section taken along lines 5—5 of FIGS. 4 and 6 showing the latch and release mechanism; and FIG. 6 is a partial plan view of the latch pin member and clock mechanism.

The invention will be understood more readily by referring to the drawings in which FIG. 1 is an illustration of an ejection sequence showing a rocket 1 in various positions before impact as the airborne radio recovery beacon 3 is ejected and strikes the ground in close proximity to the rocket. As the beacon is ejected from the rocket 1, the banner 5 forms a trailing streamer which slows the beacon 3 to an acceptably low velocity before impact with the ground.

FIG. 2 shows a partially cut-away cross-section of the rocket 1 illustrating the ejection tube 7 from which the radio beacon 3 is launched. The muzzle portion of ejection tube 7 is closed by a plastic plug 9 which is shaped so as to present a smoothly faired surface with the exterior of rocket 1. This plastic plug 9 is held in position by a shear pin 11 which serves to position the assembly within ejection tube 7 prior to ejection.

The ejection of beacon 3 is controlled by a sensing device 13 which may be a barometric altimeter, an accelerometer, or a time-of-flight operated switch. A compressed gas capsule 15 is located in the bottom of ejection tube 7 in position to propel beacon 3 in a rearward direction when ruptured. Rupture of the gas capsule 15 is effected by the ignition of a conventional squib element located therein when actuated by device 13. The pressure of the compressed gases behind beacon 3 forces the beacon 3 against the plastic plug 9 and ruptures the shear pin 11, thereby allowing the radio beacon 3 ot be ejected.

A banner cap member 7 is positioned on the rear portion of beacon 3 to present a smooth surface behind which the gas pressures required for launching may build-up, and also to contain the banner drag service 5 prior to launching. The banner drag service 5 is made up of a nylon rope member 19 (FIGS. 1 and 4) having a plurality of spaced banner supports 21 attached perpendicularly thereto with a pair of banners 23 affixed to each support 21, and disposed with the supporting rope 19 passing through a hole in the banner support between each pair of banners. The rope 19, supports 21 and banners 23 are stored in the rear portion of beacon 3 as shown in FIG. 4 of the drawings.

The end of nylon rope 19 is attached by means of a string 25 and screw 27 to the interior of banner cap 17. When the beacon is ejected from ejection tube 7, banner cap 17 falls free of beacon 3 after emerging from tube 7, thereby initiating the unfurling operation of the banner drag device 5 from its storage compartment. The function of this drag device is to produce sufficient deceleration prior to impact of the beacon 3 so that the velocity of the beacon is reduced to an acceptable value within the range of safety to the operating components of the beacon.

A typical banner drag device 5 comprises an array of 20 polyurethane plastic manners mounted in pairs on steel cross-arms that are attached to a ⅜₆ inch woven nylon tow rope. The total array measures approximately three feet in length, and each banner is ⅞ inch wide, 3 inches long and 0.01 inch thick. Although a specific description has been given of a decelerator device for the beacon 3, it will be appreciated that other drag devices, such as parachutes, could also be adapted to the particular decelerating requirements of beacon 3.

An impact damper cup 31 is mounted on the tapered nose portion 33 of beacon 3. A tapered lip portion 35 of cup member 31 has a configuration substantially matching the taper of portion 33 of beacon 3. The cup 31 is preloaded to its yield point with an arbor press on the nose portion 33 of beacon 3 so that, upon impact, the tapered shape of nose portion 33 and the complementary shape 35 of the lip portion of cup 31 produce an extruding action on the cup until the kinetic energy of the beacon 3 is reduced to zero. The engagement between the cup 31 and tapered nose 33 is controlled to remain approximately constant during the deformation process upon impact by means of an undercut relief portion 37 on the nose of beacon 3 which assures constant contact lengths between cup 31 and the beacon 3. Since an approximately constant area of stress exists at all times between the cup and the beacon, the force and deceleration is maintained at a nearly constant value. The cup material, cup thickness, and cone angle may be chosen to give the desired deceleration or "cushioning" effect for a given application. Some of the kinetic energy dissipated is transformed into heating during the plastic deformation of the metal cup, and some is transformed into heat by surface friction. The surface friction effect can be reduced by applying a solid lubricant, such as molybdenum disulfide, to the surfaces, thereby minimizing any variation in damping that would normally accompany large changes in friction coefficient. A cup material having a high mechanical elongation is preferably used to preclude cup fracture at impact. Materials which have been tested and found satisfactory are stainless steel, aluminum, and copper.

The following equation shows the approximate relationship between beacon longitudinal decelerating force F, yield strength S of the cup material, cup wall thickness $t$, length of cup engagement $d$, beacon nose taper half angle $\Phi$, and coefficient of friction $\mu$:

$$F = 2\pi\, Std(\sin \Phi + \mu \cos \Phi)$$

This relation was derived from the equation for stress in a thin-wall cylinder, $S_c = pr/t$, where $S_c$ = tangential stress
$p$ = pressure against the inside cylinder wall
$r$ = cylinder radius
$t$ = wall thickness It will be seen from the above equations that increasing the engagement length of the impact cup with the beacon nose taper portion will produce an increasing deceleration versus cup displacement characteristic.

The radio transmitter, which is not illustrated specifically in the drawings, is located in compartment 41. The antenna 49 (FIG. 3) is located in compartment 43 in antenna storage compartment 47 (FIG. 5) along with clock mechanism 45.

Antenna 49 is a quarter-wave stub made from a spring steel strip. The spring strip is coiled to be collapsible to a length of two inches, and when released, it springs to a free length of 10 to 12 inches. In FIG. 3 the strip is illustrated at 49 in its fully extended position. In FIG. 5 the strip is not visible, but is located wholly within compartment 47.

The antenna 49 is retained within compartment 47 by means of a metal band 51 which extends around the beacon 3 in the cut-out portion 53 provided therefor. The metal band 51 is fastened to the body of the beacon 3 by means of a screw 55 which holds the band to the body of the beacon 3 when the band 51 is in a fully extended position as shown in FIG. 3. A microswitch operating arm 57 (FIG. 3) holds a transmitter off-on switch in a normally off-position when the metal band 51 is secured around the body of beacon 3. When the band 51 springs free and assumes a flat position, the transmitter off-on switch is released to its on-position simultaneously with the release of antenna 49. Thus, release of the metal band 51 initiates radio transmission from the beacon.

The actions of metal band 51 and antenna 49 perform an additional function in that they produce the desired physical orientation of the beacon for radio transmission. It will be appreciated that the beacon will frequently be positioned after impact such that the antenna would not ordinarily assume a vertically erect position. However, by providing a double spring action effect with the antenna and metal band simultaneously springing free, the beacon 3 is flipped from whatever arbitrary position it had assumed upon impact to the vertically erect position shown in FIGS. 1 and 3.

The latch and release means for securing the antenna 49 in position within the beacon body 3 are illustrated in FIGS. 5 and 6 of the drawings. The mechanism for effecting the release of metal band 51 is controlled by clock 45. Clock 45 is set into operation when the beacon 3 is launched from ejection tube 7 by means of actuator pin 61 (FIG. 4). A string member 63 fastened to actuator pin 61 pulls pin 61 when banner cap 17 falls free of the beacon body 3, thereby starting the operation of clock 45. A cam wheel 65 driven by clock 45 through drive shaft 67 contains a notched portion 69, which rotates counterclockwise as shown in FIG. 5. Release cam 71 has a depending pin projection 73 which is spring-biased against the rear of cam 65 by means of spring member 75. When cam 65 rotates in position such that the notched portion 69 reaches the depending pin projection 73, the release cam 71 is allowed to rotate from a first position wherein latch pin 81 holds down metal band 51, to a second position wherein the latch pin 81 is allowed to spring free through notched portion 83 in the upper surface of release cam 71. The end of latch pin 81 not held under release cam 71 is secured in a recess 85 of the body member 3.

The cycle of cam 65 is timed in accordance with the ejection altitude desired. It has been found that a cam cycle of 40 to 60 seconds gives adequate time for beacon impact before erection of the antenna is initiated.

It will be appreciated from the foregoing discussion that the device of this invention provides a reliable airborne radio recovery beacon designed to emit radio signals and assist in the location of rockets or other missiles from which the beacon is ejected prior to impact. The banner drag device used to decelerate the beacon also assists in orienting the beacon so that the impact damper cup is positioned to receive the initial shock of impact. The impact damper cup provides the requisite cushioning to protect the operating components of the beacon. The novel metal band and spring antenna arrangement assure proper orientation of the antenna after impact and simultaneously effect operation of the radio transmitter. With the use of long-life self-contained batteries, the transmitter is equipped for operation until location can be accomplished by search forces.

While the invention has been shown and described with particular reference to a preferred embodiment, it will be understood by those skilled in the art that various changes in form and details may be made without departing from the spirit and scope of the invention.

What is claimed is:

1. An airborne radio recovery beacon comprising
   a hollow body member,
   a hollow impact damper cup member having a tapered lip portion fitted to said front portion of said hollow body member so as to deform radially upon impact and absorb impact forces,
   radio transmitter means mounted within said hollow body member,
   collapsible antenna means connected to said radio transmitter means and mounted within said hollow body member, and
   latch and release means for holding said antenna means within said hollow body member and releasing said antenna at the desired time.

2. The combination according to claim 1 wherein said collapsible antenna means comprises
   a coiled spring strip member held within said hollow body member in a substantially flat collapsed condition and expandible to an external erect position when released.

3. The combination according to claim 2 wherein said latch and release means comprises
   a band member surrounding said hollow body member,
   a pin member holding said band member in position, and
   release cam means rotatable between first and second positions to lock said pin member in said first position and release said pin member in said second position.

4. The combination according to claim 3 comprising switch means operable by said latch and release means to activate said radio transmitter means.

5. An airborne radio recovery beacon comprising
   a hollow cylindrical body member having front and rear portions, a deformable impact damper cup member mounted on said front portion of said hollow body member,
   said cup member having a tapered lip portion fitted to said front portion to produce radial deformity when impact forces said front portion completely into said cup member,
   deceleration means coupled to the rear portion of said hollow body member,
   radio transmitter means mounted within said hollow body member,
   collapsible antenna means connected to said radio transmitter means and mounted within said hollow body member, and
   latch and release means for holding said antenna means within said hollow body member in a substantially flat collapsed condition and releasing said antenna means at the desired time to expand to an external erect position.

6. The combination according to claim 5 wherein said collapsible antenna means comprises
   a coiled spring steel strip.

7. The combination according to claim 6 wherein said latch and release means comprises
   a metal band member surrounding said hollow body member and being fastened thereto at approximately the midpoint of said band member,
   a pin member holding said band member in position,
   release cam means rotatable between first and second positions to lock said pin member in said first position and release said pin member in said second position, and
   clock means for controlling said release cam means in a predetermined fashion.

8. An airborne radio recovery beacon comprising
   a hollow cylindrical body member having an elongated curvilinear side wall,
   radio transmitter means mounted within said hollow body members,
   collapsible antenna means connected to said radio transmitter means and coiled within said hollow body member about an axis perpendicular to said side wall, and
   a metal band member surrounding said hollow body member and said collapsible antenna means and being fastened to said hollow body member at approximately the midpoint of said band member.

References Cited

UNITED STATES PATENTS

| | | | |
|---|---|---|---|
| 1,298,085 | 3/1919 | Nikonow | 102—53 |
| 2,112,758 | 3/1938 | Blacker | 102—49.3 |
| 2,831,967 | 4/1958 | Bayze | 325—112 |
| 2,857,510 | 10/1958 | Haggerty et al. | 325—187 X |
| 3,102,982 | 9/1963 | Stypulkowski et al. | 325—112 X |
| 3,253,810 | 5/1966 | Penn | 325—114 X |
| 3,258,230 | 6/1966 | Bollinger et al. | 244—138 |
| 3,381,778 | 5/1968 | Von Tiesenhausen | 188—1 |

ROBERT L. GRIFFIN, Primary Examiner

BENEDICT V. SAFOUREK, Assistant Examiner

U.S. Cl. X.R.

244—138; 325—114, 115; 343—705